US006701371B1

(12) United States Patent
Lee

(10) Patent No.: US 6,701,371 B1
(45) Date of Patent: Mar. 2, 2004

(54) DATA TRANSFER METHOD FOR MATCHING UPPER PROTOCAL LAYER TO HIGH SPEED SERIAL BUS

(75) Inventor: Hee-jin Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/385,099

(22) Filed: Aug. 30, 1999

(30) Foreign Application Priority Data

Aug. 29, 1998 (KR) .......................................... 98-35423

(51) Int. Cl.[7] .............................................. G06F 15/16
(52) U.S. Cl. ...................... 709/231; 709/102; 709/103; 709/104; 709/221; 709/240
(58) Field of Search ................................ 709/231, 102, 709/103, 240, 221; 370/429, 487, 260, 503

(56) References Cited

U.S. PATENT DOCUMENTS

| 5,802,059 A | * | 9/1998 | Hayashi ........................ 370/412 |
| 5,825,752 A | * | 10/1998 | Fujimori et al. ........... 348/14.08 |
| 5,991,520 A | * | 11/1999 | Smyers et al. ................. 709/328 |
| 6,169,745 B1 | * | 1/2001 | Liu et al. ........................ 370/463 |
| 6,219,697 B1 | * | 4/2001 | Lawande et al. ............. 709/220 |
| 6,233,637 B1 | * | 5/2001 | Smyers et al. ................. 710/311 |
| 6,333,938 B1 | * | 12/2001 | Baker ........................... 370/503 |
| 6,356,558 B1 | * | 3/2002 | Hauck et al. ................. 370/450 |
| 6,397,277 B1 | * | 5/2002 | Kato et al. .................... 710/104 |
| 2001/0019561 A1 | * | 9/2001 | Staats ........................... 370/487 |

FOREIGN PATENT DOCUMENTS

| EP | 0 841 833 A2 | 5/1998 | ............ H04Q/11/04 |
| EP | 0 933 900 A2 | 8/1999 | ............ H04L/12/46 |
| JP | 9-93250 | 4/1997 | |
| JP | 9-281961 | 10/1997 | |
| JP | 2000-510659 | 8/2000 | |
| WO | 98/47271 | 10/1998 | ............ H04L/29/06 |

* cited by examiner

Primary Examiner—Hosain Alam
Assistant Examiner—Oanh Duong
(74) Attorney, Agent, or Firm—Sughrue Mion, PLLC

(57) ABSTRACT

A data transfer method for matching an upper protocol layer to a high speed serial bus. In the data transfer method, it is determined whether transfer data to be transferred from the upper protocol layer to the high speed serial bus, is stream data that is transferred to a predetermined node which the bus can identify, and form data flow defined by a predetermined flow classifier. If the transfer data is determined to be stream data, a channel is allocated in the bus and the transfer data is transferred through the channel. However, if the transfer data is determined not to be stream data, the transfer data is transferred by an asynchronous transfer method according to the high speed serial bus standard, without allocating a channel. Due to a channel Matron of the high speed serial bus, an upper protocol layer of existing applications which do not specify a service to provide, can be effectively matched to the high speed serial bus.

20 Claims, 5 Drawing Sheets

FIG. 4

| destination address | status | TTL | X | Y | channel number | node_id |
|---|---|---|---|---|---|---|

DATA TRANSFER METHOD FOR MATCHING UPPER PROTOCAL LAYER TO HIGH SPEED SERIAL BUS

BACKGROUND OF THE INVENTION

1. Field of the Invention

The present invention relates to a data transfer method, and more particularly, to a data transfer method for matching an upper protocol layer and IEEE 1394 data bus in order to effectively transfer data of an upper layer through the IEEE 1394 data bus while maintaining transparency of data packets in an existent communications application.

2. Description of the Related Art

The IEEE 1394 bus, a high speed serial bus, allows real-time multimedia data transfer. The IEEE 1394 bus provides an asynchronous service, an isochronous stream service or an asynchronous stream service. In this specification, the isochronous stream and asynchronous stream services are collectively called "stream service."

FIG. 1 shows a communication layer for serving a general data communications application such as FTP (File Transfer Protocol) and data flow when packets are transferred by the asynchronous service. Data packets made by the existent applications do not specify a subaction type provided by the 1394 link.

Thus, when a communications application transfers data from an upper layer to the IEEE 1394 bus, the upper layer is not aware of the IEEE bus, so that not all functions provided by the 1394 serial bus can be sufficiently utilized.

Two matching methods can be considered; one for transferring data by considering all data packets to be asynchronous subaction, and the other for transferring data by considering all data packets to be isochronous subaction. However, the 1394 serial bus source cannot be effectively managed by the former method. That is, data provided by a connectionless oriented service such as IP (Internet Protocol) can be simply loaded on the 1394 asynchronous packet. However, in the few instances where applications actively use IEEE 1394 isochronous/asynchronous stream, the 1394 channel cannot be effectively utilized. Also, when asynchronous packets are congested with isochronous service, a basic cycle (125 ms) of the 1394 bus can not be maintained, so that the isochronous service becomes unstable.

Meanwhile, the latter method where all data packets are considered a wastes a limited channel source by allocating channels to all connections or allocating channels even when the amount of data is small, causing overload.

SUMMARY OF THE INVENTION

It is an object of the present invention to provide a method for matching an upper protocol layer for transferring data of an upper layer to an IEEE 1394 bus, capable of effectively transferring data packets of existing communications applications by an IEEE 1394 transfer method, while maintaining the transparency of transferred data.

In one embodiment, the present invention provides a data transfer method for matching an upper protocol layer to a high speed serial bus, the method comprising: (a) determining whether transfer data transferred from the upper protocol layer to the high speed serial bus is stream data, by identifying a transfer data type using a predetermined flow classifier; (b) if the transfer data is determined to be stream data, allocating a channel in the bus and transferring the transfer data through the channel; and (c) if the transfer data is determined not to be stream data, transferring the transfer data by an asynchronous transfer method according to the high speed serial bus standard, without allocating a channel.

Preferably, the flow classifier is at least one selected from the group consisting of an X/Y classifier which determines data flow by detecting a predetermined number of datagrams in a given amount time, a protocol classifier which determines data flow by detecting Transmission Control Protocol (TCP), or a classifier which determines data flow according to the port number of a transport layer.

In another embodiment, the present invention provides a data transfer method for matching an upper protocol layer to a high speed serial bus, the method comprising: (a) determining whether transfer data to be transferred from the upper protocol layer to the high speed serial bus, is stream data that is continuously transferred to a predetermined node which the bus can identify, by more than a predetermined amount; (b) if the transfer data is determined to be stream data, allocating a channel in the bus and transferring the transfer data through the channel; and (c) if the transfer data is determined not to be stream data, transferring the transfer data by an asynchronous transfer method according to the high speed serial bus standard, without allocating a channel.

Preferably, the data transfer method further comprises the steps of: storing a destination address of the transfer data and information about the allocated channel if the transfer data is determined to be stream data; and if the following transfer data is stream data and the destination address thereof is identical to the stored destination data of the preceding transfer data, transferring the transfer data through the corresponding channel.

Preferably, the step (b) of allocating a channel in the bus and transferring the transfer data through the channel comprises the step of determining whether the stream data is isochronous stream data or asynchronous stream data. Then, if the stream data is determined to be isochronous data, a channel and bandwidth both are allocated and the data is transferred through the allocated channel. If the stream data is asynchronous stream data, only a channel is allocated and the data is transferred through the allocated channel.

BRIEF DESCRIPTION OF THE DRAWINGS

The above objects and advantages of the present invention will become more apparent by describing in detail preferred embodiments thereof with reference to the attached drawings in which:

FIG. 4 shows a data format of entry constituting the Matron__note; and

DESCRIPTION OF THE PREFERRED EMBODIMENTS

Figure 1:
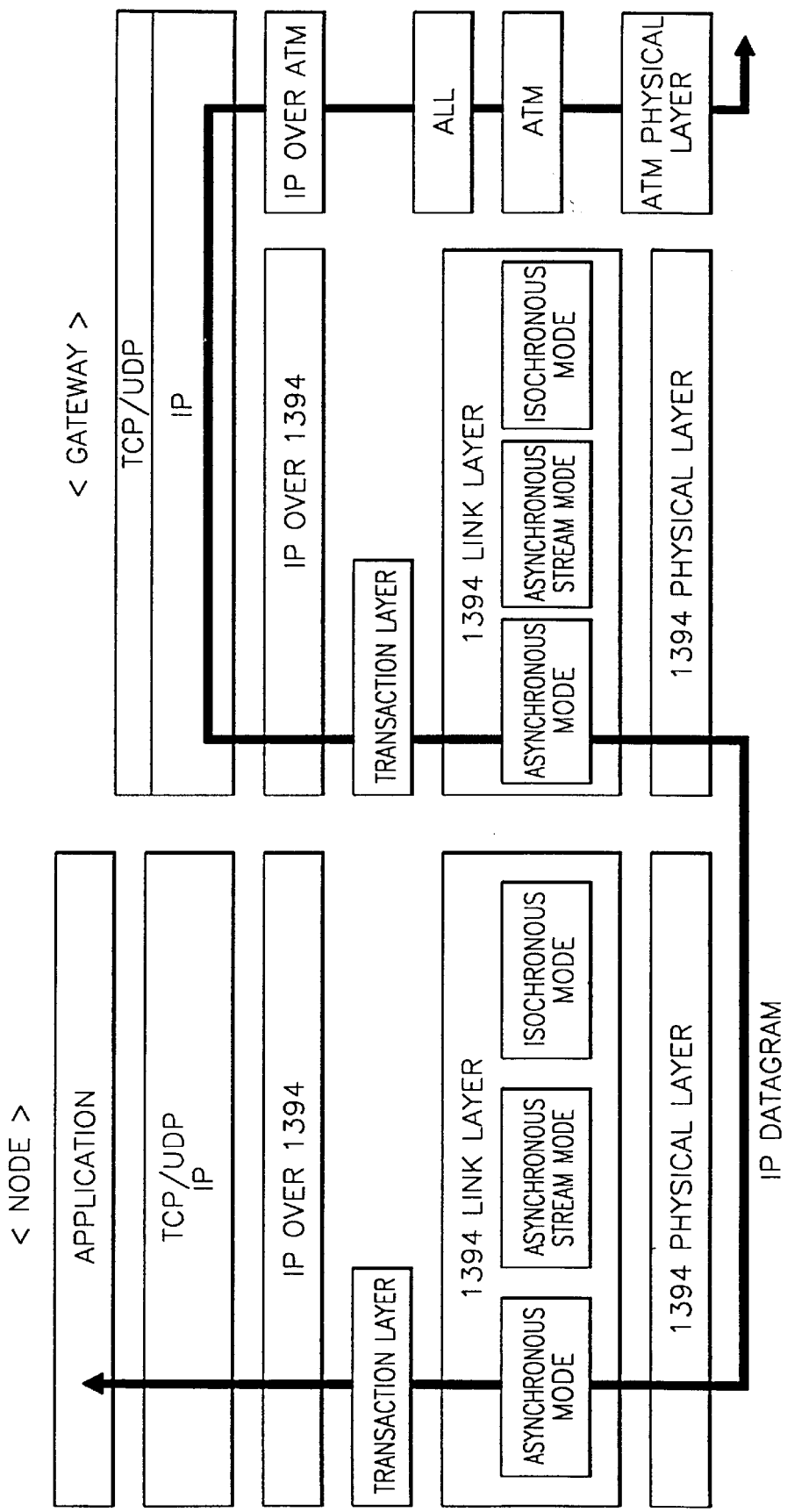
FIG. 1 shows a communication layer for a general data communications service such as File Transfer Protocol (FTP) and data flow when a packet is transferred by an asynchronous service.
Figure 2:
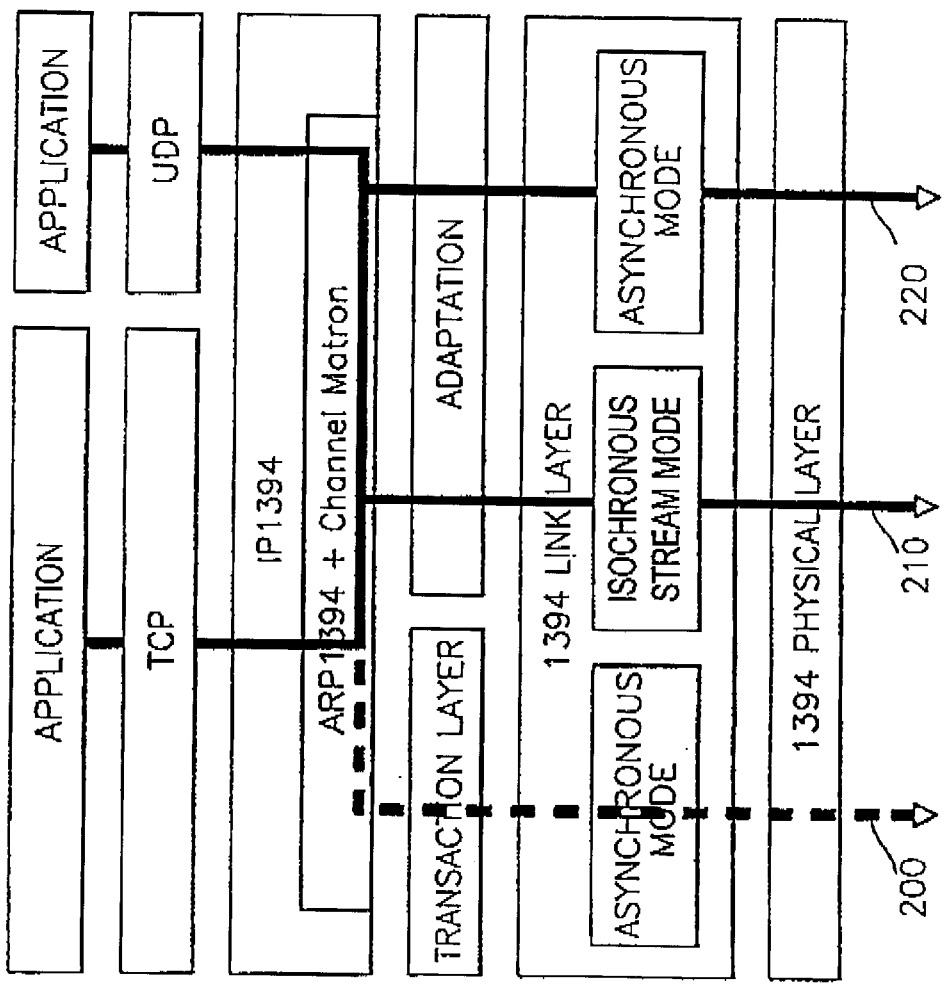
FIG. 2 shows a protocol stack and data flow therein, to which a data transfer method according to a preferred embodiment of the present invention is applied.

In FIG. 2, when data is transferred to an Internet Protocol (IP) 1394 layer from a data transfer application through a File Transfer Protocol (FTP) or User Datagram Protocol (UDP) layer, the IP 1394 layer comprising an Address Resolution Protocol (ARP) 1394 and a Channel Matron, which carries out a data transfer method according to the present invention, receives the data. The Channel Matron of the IP 1394 layer, a kind of data transfer controller, allows effective data transfer of the received data to the IEEE 1394 serial bus. Hereinafter, for convenience, the data controller is called Channel Matron or Matron.

It is checked whether the data transferred from an upper layer to a high speed serial bus is transferred to a predetermined node which can be identified by the bus, forming data flow identified by a flow classifier. The flow classifier may be an X/Y classifier which determines data flow by detecting a predetermined amount of data in a given amount time, a protocol classifier which determines data flow by detecting Transmission Control Protocol (TCP), or a port classifier which determines data flow according to the port number of a transport layer.

Hereinafter, the use of X/Y classifier will be described as an example. That—is, the Matron checks for a predetermined duration, whether a predetermined amount of data is continuously transferred from the upper layer to a predetermined node which the IEEE 1394 serial bus can identify. If the conditions are satisfied, the transfer data is determined to be stream data.

If the data transferred through the bus is stream data, the Matron allocates channels in the IEEE 1394 serial bus and transfers the data through the channels. Channels are allocated in consideration of the usable bandwidth of the bus and data is transmitted through the allocated channels. However, while the data flows through the allocated channels, the bandwidth of channels can be reallocated or the allocated channels can be deallocated by periodically checking the packet transmission rate and the bandwidth of the bus.

In contrast, when the data transferred through the bus is not stream data, the data is transferred by an asynchronous transfer method according to the IEEE 1394 standard without allocating channels. That is, a 1394 link layer converts the transfer data into asynchronous packets according to the IEEE 1394 standard and a 1394 physical layer transfers the converted asynchronous packet to the bus (see a path 200 in FIG. 2).

Meanwhile, when the transfer data is stream data, the destination address as of the transfer data and information about the allocated channels are stored. The channel information is stored in an information storage called "Matron_note." The destination address of the transfer data, which follows the channel information, is read. If the read address is identical to the destination address of the transfer data stored in the Matron_note, a determination of whether the transfer data is stream data is made using a status field, the stored channel information is read, and the data is transferred to the channel corresponding to the channel information. Here, in determining whether the transfer data is stream data, the amount of data can be determined according to the number of packets or bytes received in a given amount time.

Preferably, the transfer data is determined to be stream data, it is determined whether the stream data is isochronous stream data or asynchronous stream data. Such determination can be made by various methods. In the present embodiment, prior to the determination, it is checked whether the bandwidth of the 1394 local bus is sufficient for the isochronous stream data. If the bandwidth is insufficient and the allocated channel is used for other purposes, rather than for transmission, the transfer data is determined to be asynchronous stream data. Then, only a channel is allocated without bandwith reservation of channel to transfer data. That is, the 1394 link layer converts the transfer data into asynchronous stream data according to the IEEE 1394 standard and the 1394 physical layer transfers the converted asynchronous stream data to the bus (see the path 220 of FIG. 2).

In contrast, if the stream data is isochronous stream data, a channel and bandwidth are allocated to transfer the data. That is, the 1394 link layer converts the transfer data into isochronous stream data according to the IEEE 1394 standard, and the 1394 physical layer transfers the converted isochronous stream data to the bus (see the path 220 of FIG. 2). Alternatively, in the determination of whether the transfer data is stream data, if the transfer packet is continuously transferred to a predetermined node for a predetermined duration, even if the amount of data is less than a predetermined amount, the transfer data may be determined to be the asynchronous stream data.

Figure 3:
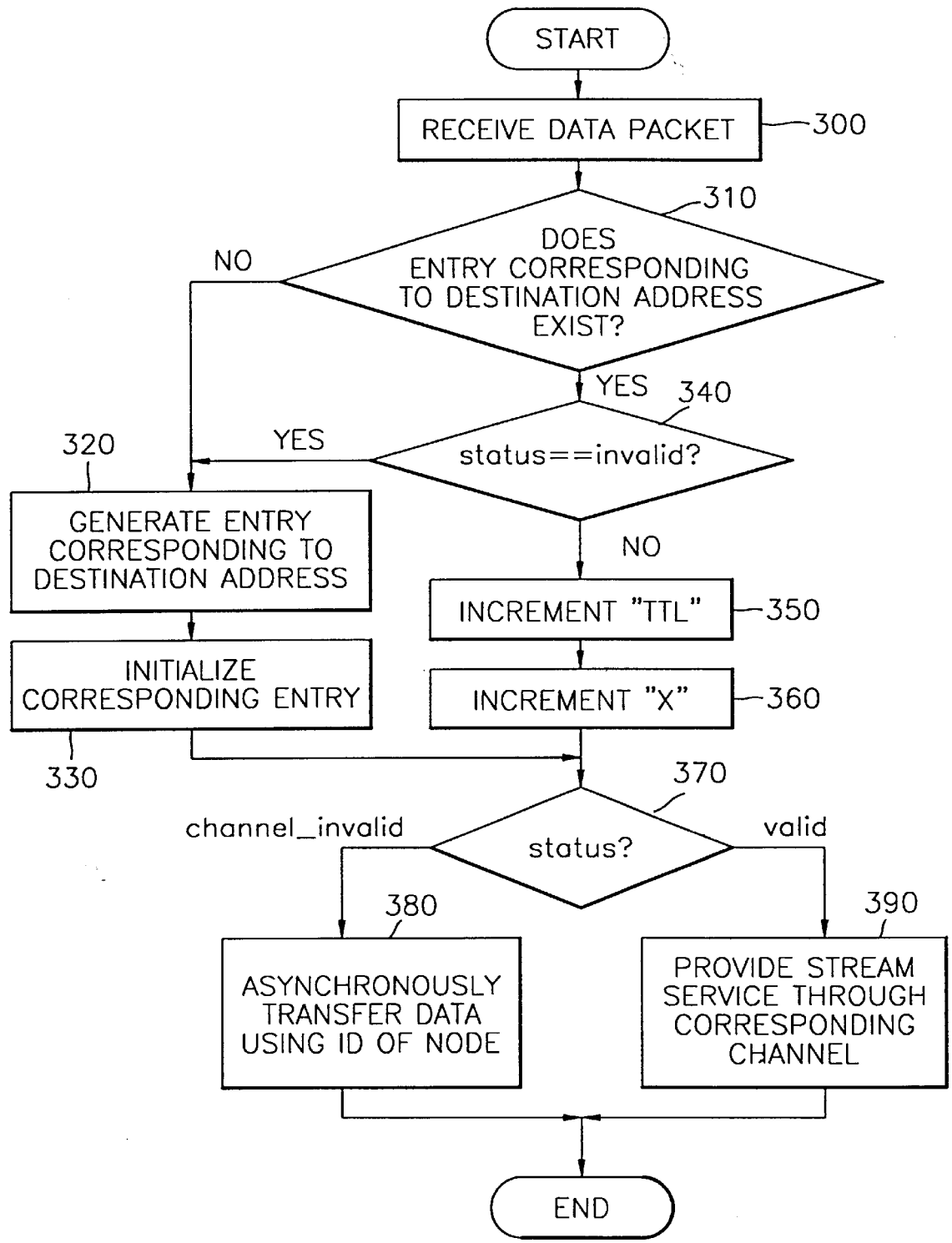
FIG. 3 is a flowchart illustrating the stream data decision algorithm in the method of FIG. 2.
Figure 5:
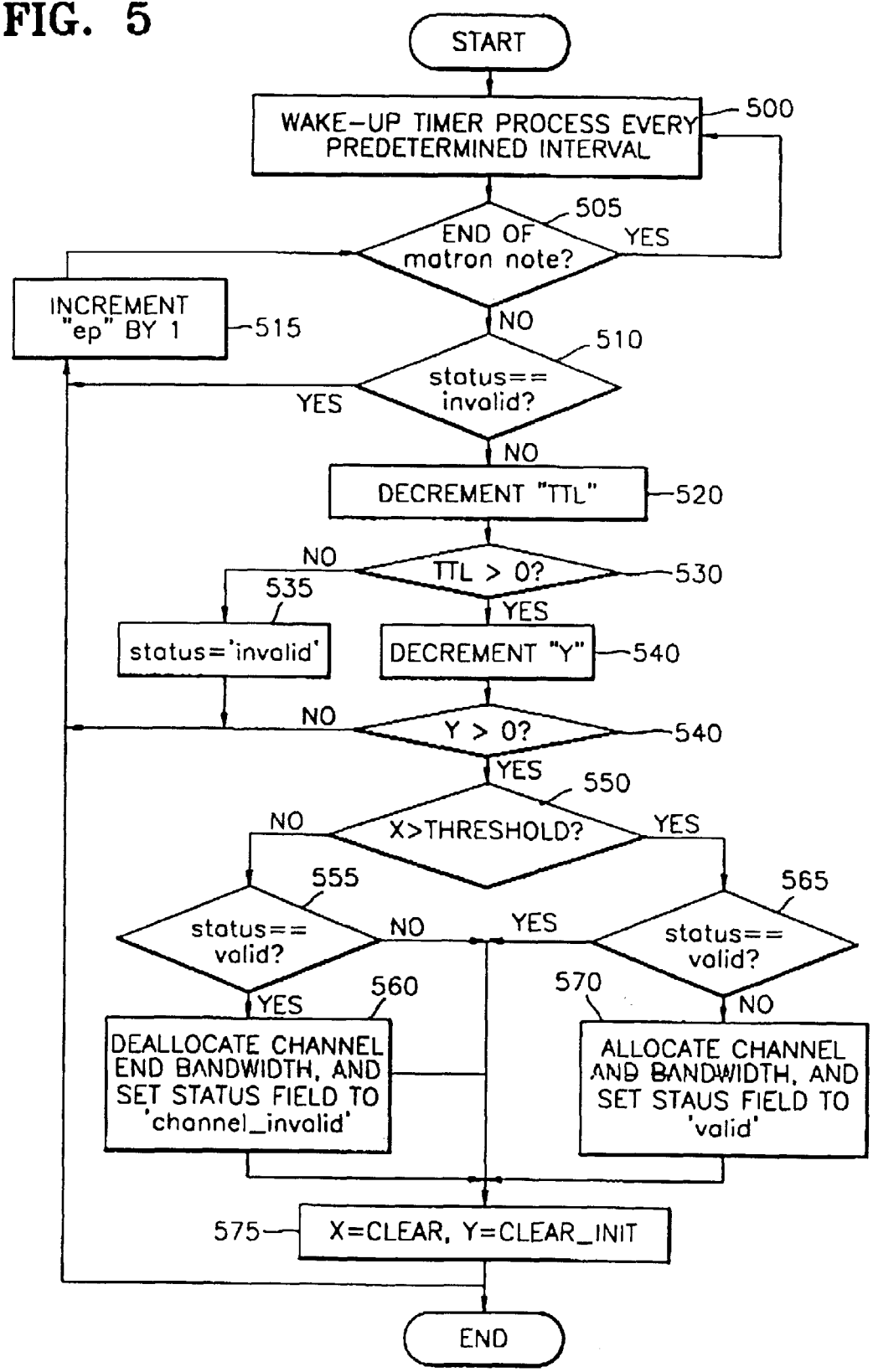
FIG. 5 is a flowchart of the algorithm of a timer process for allocating channels or deallocating the allocated channels.

Referring to FIGS. 3 through 5, which illustrate the above data transfer method in detail, in particular, the step of transferring data stream, the Matron receives a data packet from the upper layer (step 300) and detects the destination address of the data packet. Then, the Matron determines whether the entry corresponding to the destination address is present in the Matron_note (step 310).

FIG. 4 shows the data format of the entry constituting the Matron_note. The field of "destination address" indicates the destination address of the transfer data format. The destination address is information which identifies data flow in a system, such as a port or session number. The field of "status" indicates the status of entry which can be expressed as 'valid', 'invalid' or 'channel_invalid.' The 'valid' status represents that the transfer data packet is stream data, and the 'invalid' represents that the corresponding entry itself is invalid. Also, the 'channel_invalid' represents that packet is transmitted by asynchronous packet transfer. In FIG. 4, the field of 'TTL (time-to-live)' represents the period of time during which the entry stays in the Matron_note. The field of "X" represents the number of packets used to determine whether the transfer packet is stream data, and the field of "Y" represents a predetermined time factor for which the number of packets are checked. The field of "channel number" represents the channel number allocated for the stream transfer and the field of "node_id" represents the identification (ID) number of a node which the IEEE 1394 serial bus can identify.

If step 310 determines that the entry corresponding to the destination address is not present, an entry corresponding to the destination address is generated (step 320) and the corresponding entry is set to an initial value (step 330). Meanwhile, if the corresponding entry is present in the Matron_note, the status field of the entry (see FIG. 4) is examined (step 340). If the status field does not show the sign of 'invalid', the values of 'TTL' and 'X' are incremented by one (steps 350 and 360). If the status field shows the sign of 'invalid', a corresponding entry is generated and then set to an initial value (steps 320 and 330).

After the step 330 or 360, the status of the entry is examined (step 370). If the status of the entry shows the 'channel_invalid' status, the asynchronous transfer is carried out using the ID number of the node (step 380). However, when the status of the entry is 'valid', the channel number is read from the field of 'channel number' and the bus provides the stream service through the IEEE 1394 link layer using the channel corresponding to the read channel number (step 390). After the step 380 or 390, the data is transferred to the destination through the IEEE 1394 link and physical layers.

FIG. 5 is a flowchart of a timer processing algorithm for allocating channels or deallocating the channels in the data transfer method according to the present invention. In FIG. 5, "ep (abbreviated for entry pointer)" represents a pointer indicating an entry in the Matron_note, "X" indicates the count value of packets in X/Y classifier, and "Y" represents the time for which the number of packets is counted in X/Y classifier. According to the timer processing algorithm, the timer process wakes up in a predetermined interval (step 500). After the waking up, it is determined whether "ep" is Null, that is, whether the entry corresponds to the end of the Matron_note (step 505). If "ep" is Null, the timer process sleeps for a predetermined period and then wakes up. If "ep" is not Null, the status field of the entry is read and a determination of whether the status field is 'invalid,' is made (step 510). If the status field indicates on 'invalid,' "ep" is incremented by 1 for the next entry (step 515) and the process moves to the step 505. If the status field does not indicate 'invalid,' the value of TTL is decremented (step 520) and a decision of whether the TTL value is greater than zero is made (step 530). If not, the status field is changed to 'invalid' (step 535) and the process moves to the step 515. That is, the TTL value not greater than zero means that the corresponding entry of the transfer packet is not present in the Matron_note. If the TTL value is greater than zero, "Y" is decremented (step 540) and it is determined whether "Y" is greater than zero (step 545). If not, the process moves to the step 515. If "Y" is greater than 0, it is determined whether X is greater than a threshold value in step 550.

If X is not greater than the threshold value, the status field is examined (step 555). If the status field is 'valid,' the channel is deallocated, and if the bandwidth is allocated, the bandwidth is also deallocated, and the status field is set to 'channel invalid' (step 560). If X is greater than the threshold value, it is determined whether the status field is 'valid' (step 565). If the channel status is 'valid,' a channel is allocated, a bandwidth is also allocated if required, and then the status field is set to 'valid' (step 570). Conversely, if the step 555 determines that the status field is not 'valid' or if the step 565 determines that the status field is 'valid,' "X" is cleared and "Y" is set to CLEAR_INT (step 575) and the process moves to the step 515. The step 575 is also carried out after the step 560 or 570.

In the data transfer method according to the present invention, the channel Matron of the IEEE 1394 bus node selects an appropriate transfer method according to data flow, and allocates, reallocates and deallocates the bandwidth to the channels, thereby effectively matching existing applications which do not specify a kind of service in the IEEE 1394 to use, to the IEEE 1394 bus and efficiently utilizing channels.

The invention may be embodied in a general purpose digital computer by running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium having a computer readable program code unit embodied therein for matching an upper protocol layer to the IEEE 1394 serial bus in a data transfer method, the computer readable program code means in the computer usable medium comprising: computer readable program code means for causing a computer to effect determining whether transfer data to be transferred from the upper protocol layer to the high speed serial bus, is stream data that is transferred to a predetermined node which the bus can identify, and form data flow defined by a predetermined flow classifier; computer readable program code means for causing a computer to effect, if the transfer data is determined to be stream data, allocating a channel in the bus and transferring the transfer data through the channel; and computer readable program code means for causing a computer to effect, if the transfer data is determined not to be stream data, transferring the transfer data by an asynchronous transfer method according to the high speed serial bus standard, without allocating a channel, for instance. A functional program, code and code segments, used to implement the present invention can be derived by a skilled computer programmer from the description of the invention contained herein.

As described above, in the data transfer method according to the present invention, in which the upper protocol layer is matched to a high speed serial bus, the channel Matron of the IEEE 1394 bus node effectively matches conventional applications which do not indicate a service of the IEEE 1394 while maintaining the transparency of a communications protocol. Also, existing applications can transfer data faster while reducing deterioration in quality of service (QOS) of the 1394 bus, which occurs in a conventional communications method, thus providing excellent performance for applications compared to an Ethernet of equivalent price.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A data transfer method for matching an upper protocol layer to a high speed serial bus, comprising:
    (a) determining whether transfer data transferred from the upper protocol layer to the high speed serial bus is stream data, by identifying a transfer data type using a flow classifier which determines data flow by detecting a predetermined number of datagrams in a given amount of time;
    (b) allocating a channel in the high speed serial bus and transferring the transfer data through the channel when the transfer data is determined to be stream data; and
    (c) transferring the transfer data by an asynchronous transfer method according to the high speed serial bus standard, without allocating a channel, when the transfer data is determined not to be stream data.

2. The method of claim 1, wherein the high speed serial bus satisfies the IEEE 1394 standard.

3. A data transfer method for matching an upper protocol layer to a high speed serial bus, comprising the steps of:
    (a) determining whether transfer data transferred from the upper protocol layer to the high speed serial bus is stream data that is continuously transferred to a predetermined node for a predetermined duration and by more than a predetermined amount;
    (b) allocating a channel in the bus and transferring the transfer data through the channel when the transfer data is determined to be stream data; and
    (c) transferring the transfer data by an asynchronous transfer method according to the high speed serial bus standard, without allocating a channel, when the transfer data is determined not to be stream data.

4. The method of claim 3, further comprising the steps of:
   (d) storing a destination address of the transfer data and information about the allocated channel when the transfer data is determined to be stream data; and
   (e) transferring the transfer data through the corresponding channel when the transfer data is stream data and the destination address thereof is identical to the stored destination data of the transfer data in step (d).

5. The method of claim 3, wherein the predetermined amount of transfer data in step (a) is determined by the number of packets received from the upper protocol layer in a given amount of time.

6. The method of claim 3, wherein the predetermined amount of transfer data in step (a) is determined by the number of bytes in a given amount of time.

7. The method of claim 3, wherein step (b) further comprises:
   (b1) determining whether the stream data is isochronous stream data or asynchronous stream data; and
   (b2) when the stream data is determined to be isochronous data, allocating a channel and bandwidth and transferring the transfer data through the allocated channel, and when the stream data is determined to be asynchronous stream data, allocating a channel and transferring the transfer data through the allocated channel.

8. The method of claim 3, where in step (a), the transfer data is determined to be stream data when the transfer data is continuously transferred to the predetermined node for the predetermined time period, even though the amount of transfer data is less than the predetermined amount.

9. The method of claim 3, wherein the high speed serial bus satisfies the IEEE 1394 standard.

10. The method of claim 4, wherein the high speed serial bus satisfies the IEEE 1394 standard.

11. The method of claim 5, wherein the high speed serial bus satisfies the IEEE 1394 standard.

12. The method of claim 6, wherein the high speed serial bus satisfies the IEEE 1394 standard.

13. The method of claim 7, wherein the high speed serial bus satisfies the IEEE 1394 standard.

14. The method of claim 8, wherein the high speed serial bus satisfies the IEEE 1394 standard.

15. The method of claim 1, wherein the high speed serial bus identifies whether the transfer data is transferred to a predetermined node.

16. The method of claim 15, wherein the high speed serial bus satisfies the IEEE 1394 standard.

17. The method of claim 3, wherein the high speed serial bus identifies whether the transfer data is transferred to a predetermined node.

18. The method of claim 17, wherein the high speed serial bus satisfies the IEEE 1394 standard.

19. A high speed serial bus having an Internet Protocol 1394 layer, comprising:
   means for determining whether data transferred from an upper layer to said high speed serial bus is stream data by identifying a transfer data type using a flow classifier which determines data flow by detecting a predetermined number of datagrams in a given amount of time; and
   means transferring data to a destination node through one of an asynchronous mode, isochronous stream mode and asynchronous mode.

20. The high speed serial bus according to claim 19, further comprising means for determining whether data transferred from an upper layer to said high speed serial bus is directed to a predetermined node.

* * * * *